US012703619B2

(12) United States Patent
Schoenfelder

(10) Patent No.: US 12,703,619 B2
(45) Date of Patent: Aug. 11, 2026

(54) CAPPER HEAD FOR CAPPER

(71) Applicant: KRONES AG, Neutraubling (DE)

(72) Inventor: Markus Schoenfelder, Regensburg (DE)

(73) Assignee: KRONES AG, Neutraubling (DE)

( * ) Notice: Subject to any disclaimer, the term of this patent is extended or adjusted under 35 U.S.C. 154(b) by 8 days.

(21) Appl. No.: 18/484,756

(22) Filed: Oct. 11, 2023

(65) Prior Publication Data

US 2024/0116741 A1 Apr. 11, 2024

(30) Foreign Application Priority Data

Oct. 11, 2022 (DE) ......................... 102022126330.4

(51) Int. Cl.
*B67B 3/18* (2006.01)
*B67B 3/12* (2006.01)

(52) U.S. Cl.
CPC .................. *B67B 3/18* (2013.01); *B67B 3/12* (2013.01); *B67B 2201/017* (2013.01)

(58) Field of Classification Search
CPC ....... B67B 3/18; B67B 3/12; B67B 2201/017; B67B 3/2066; B67B 2201/08; B67B 3/2033; B67B 3/2073; B67B 2201/10
See application file for complete search history.

(56) References Cited

U.S. PATENT DOCUMENTS 2,579,775 A * 12/1951 Allen ......................... B67B 3/14 156/565
3,895,478 A 7/1975 Friendship
10,787,353 B2 9/2020 Schoenfelder
2018/0354765 A1* 12/2018 Schoenfelder ........ B67B 3/2066
2022/0306442 A1* 9/2022 Rusconi ................ B67B 3/2033

FOREIGN PATENT DOCUMENTS

| | | | |
|---|---|---|---|
| CN | 207330302 | U | 5/2018 |
| DE | 3912324 | A1 | 10/1990 |
| DE | 102020126257 | A1 | 4/2022 |
| EP | 0444500 | A1 | 9/1991 |
| EP | 3702318 | A1 | 9/2020 |
| GB | 1527251 | A | 10/1978 |
| WO | WO2020/249286 | A1 | 12/2020 |

OTHER PUBLICATIONS

English abstract of DE102020126257A1.

* cited by examiner

*Primary Examiner* — Veronica Martin
(74) *Attorney, Agent, or Firm* — Caesar Rivise, PC

(57) ABSTRACT

The invention relates to a capper head having at least one movement arm, which has an actuation section for actuating the at least one movement arm and a contact section for contacting a cap. The capper head further has a control element that is or may be brought into contact with the actuation section of the at least one movement arm to effect a movement of the at least one movement arm, and a cover that covers the control element and the actuation section of the at least one movement arm. Preferably, the cover may protect important components of the capper head from cleaning fluid, etc.

20 Claims, 4 Drawing Sheets

CAPPER HEAD FOR CAPPER

CROSS REFERENCE TO RELATED APPLICATIONS

This application claims priority from German Patent Application No. 10 2022 126 330.4 filed Oct. 11, 2022, the contents of which application is incorporated herein by reference in its entireties for all purposes.

TECHNICAL FIELD

The invention relates to a capper head for a capper for capping a container.

TECHNICAL BACKGROUND

Cappers, for example in the form of capper carousels or rotary-type cappers, are known for capping containers in container filling lines. For example, a capper may have multiple capper heads capable of applying a cap to a container mouth of a filled container. For example, the capper head may screw a screw cap onto a container or roll a (for example, aluminum) roll-on cap onto a (for example, glass) container.

DE 10 2020 126 257 A1 concerns a device for capping a container with a roll-on cap. The device comprises a tappet for applying a head pressure to a roll-on cap to be rolled on, a support rotatable relative to the tappet about the longitudinal axis thereof, a forming arm pivotally arranged on the support, and a forming roller mounted so as to be rotatable on the forming arm relative to the forming arm for inserting a formation into a side surface of the roll-on cap. The forming roller is mounted on the forming arm via a rolling bearing, preferably a needle bearing.

EP 3 702 318 A1 relates to a capper head for capping a container with a screw cap in a beverage filling line. The capper head comprises a gripping mechanism for gripping the container cap with at least one gripping arm pivotable about a mounting and a holding jaw arranged on the holding clamp for holding the container cap.

Conventional capper heads may be disadvantageous for increased cleaning and hygiene requirements, for example in clean room environments. Disadvantages may include poor cleanability, the use of non-ferrous metals and/or the need for lubrication of the capper heads.

The invention includes the object of creating an improved capper head with which preferably increased cleaning and/or hygiene requirements, for example in clean room environments, can also be met.

SUMMARY OF THE INVENTION

The object listed above may be achieved by the features of independent claim 1. Advantageous developments are specified in the dependent claims and the description.

One aspect of the present disclosure relates to a capper head for a capper (for example, capper carousel) for capping a container. The capper head has at least one, preferably pivotable, movement arm having (for example, in each case) an actuation section for actuating the at least one movement arm and a contact section for contacting the cap. The capper head further has a, preferably axially movable, control element, which is or may be brought into contact with the actuation section of the at least one movement arm to effect a, preferably pivoting, movement of the at least one movement arm. The capper head has a, preferably hood-shaped or trough-shaped, cover covering the control element and the actuation section of the at least one movement arm, preferably for protection from cleaning fluid during external cleaning of the capper head.

Advantageously, the capper head may provide a consistent separation of cleanable and non-cleanable regions by means of the cover. Substantial regions of the capper head's operation, such as the control element and the actuation section of the at least one movement arm, may be protected by means of the cover. Such components cannot then be contaminated by product (filling material), cleaners or sterilization media. This allows for a simple, robust and cost-effective assembly. With appropriate seals on the cover, for example, a reliable clean room separation may be created.

Preferably, the contact section and the actuation section may be arranged at opposite ends of the respective movement arm.

In one exemplary embodiment, the control element and the actuation section of the at least one movement arm are received inside the cover in a sealed and/or encapsulated manner. Advantageously, this may further support consistent clean room separation, since the substantial functional elements, such as the control element and the actuation section (s), may be arranged in a manner protected behind seals inside the cover.

In a further exemplary embodiment, the at least one movement arm projects from the cover in a sealed manner, such that preferably the contact section of the at least one movement arm is arranged outside of the cover. Advantageously, this allows the contact section to be cleaned without the cleaning fluid being able to reach the actuation section or the control element inside the cover.

In a further exemplary embodiment, the capper head further has a lid that is attached to the underside of the cover (for example, by means of screw connections) and through which the at least one movement arm extends in a sealed manner, preferably decentrally with respect to the lid. Preferably, the at least one movement arm may be pivotably mounted on the lid. Advantageously, on the one hand the ability to mount of the capper head can be improved, wherein the protected arrangement of the control element and the actuation section(s) may be realized in a simple manner in terms of design. Advantageously, the lid may also fulfill additional functions, such as the aforementioned pivot mounting and the sealing of the cover on the underside. The two can also be mutually beneficial, since close proximity between the seal and the pivot mounting can simplify sealing.

In one embodiment, the capper head further has at least one sealing device that creates a seal between the lid and the at least one movement arm, preferably for sealing a pivoting movement of the respective movement arm, an axial movement of the contact section of the respective movement arm and/or a rotational movement of the contact section of the respective movement arm. Advantageously, this may further support the clean room separation described and, for example, the control element and the actuation section(s) may be arranged inside the cover in a particularly protected manner.

In a further embodiment, the at least one movement arm has an axial bearing section, in which the contact section is mounted so as to be axially movable, and the at least one sealing device seals an axial movement of the contact section relative to the axial bearing section between the lid and the contact section. Alternatively or additionally, the at least one movement arm has a rotational bearing section, in which the contact section is mounted so as to be rotatable, and the at least one sealing device seals rotational movement of the contact section relative to the rotational bearing section between the lid and the contact section. Alternatively or additionally, the at least one movement arm is pivotable, and the at least one sealing device seals a pivoting movement of the respective movement arm between the lid and the contact section. Advantageously, a particularly comprehensive and durable seal can be achieved in this manner.

In one design variant, the sealing device has a bellows that expands or compresses axially when the contact section moves axially, and/or a sealing sleeve that moves axially with the contact section and/or expands or compresses axially when the contact section moves axially. Alternatively or additionally, the sealing device may, for example, have a radial shaft seal, for example arranged between the sealing sleeve and the contact section of the respective movement arm. Advantageously, in this manner a simple implementation in terms of design of the sealing device can be achieved, while maintaining the desired sealing functions.

Preferably, the bellows and the sealing sleeve may be connected to one another, for example in a positive-locking manner.

In a further design variant, the capper head further has a pressing device having a, preferably rotatably mounted, plunger for pressing the cap onto a container mouth of the container, wherein the plunger projects from the cover and/or the lid in a sealed manner. Advantageously, the function of the capper head can thus be extended, while the sealing of the components inside the cover can be further ensured.

In one exemplary embodiment, the pressing device further has a sealing element, preferably a radial shaft seal, which creates a seal between the lid and the plunger. Preferably, the plunger may be axially secured to the lid, and/or the plunger may be centrally arranged with respect to the lid. Advantageously, this enables a simple implementation in terms of design.

In a further exemplary embodiment, the cover is a section, preferably a (for example, lower) end section, of a shaft, preferably a hollow shaft, for rotating the capper head, and/or the cover supports the at least one movement arm (for example, over the lid). Advantageously, the cover may thus combine further functions, for example the rotation of the capper head and/or the function of a support.

In one embodiment, the capper head further has a bellows arranged coaxially with the shaft and optionally a radial shaft seal that creates a seal between the bellows and the shaft. Preferably, the radial shaft seal may be secured axially at one end of the bellows (for example, via a securing ring (for example, a snap ring)). Advantageously, on the one hand a simple implementation in terms of design can be achieved and the clean room separation explained can be further supported.

In a further embodiment, the control element is pneumatically actuated, and/or the control element is or has a control wedge, and/or the control element is centrally arranged inside the cover. Advantageously, pneumatic control may, for example, eliminate the need for conventional mechanical cap detection.

It is possible that for the pneumatic actuation or control it is necessary to detect or determine whether a cap is on the container before the container enters. The background may be, for example, that the cap may be pulled out of the channel and positioned on the container before it is capped by a container running past a channel. Then, the container runs to the capper head and is capped. However, the capping process should not start if a container without a cap reaches the capper head (for example, due to a towing error). This situation is to preferably be recognized.

For example, a, preferably inductive, sensor may be comprised, preferably arranged upstream on the container of the capper head (for example, as part of the capper, preferably capper carousel, or upstream thereof). The sensor may be arranged and configured to detect whether a cap is positioned (or not) on the container.

Alternatively or additionally, for example by means of a servo drive connected to the capper head for rotating the capper head, it can be recognized by a change in torque (during, for example, a slow process start-up) that no cap is positioned on the container, and a capping process may be aborted.

Alternatively or additionally, the pneumatic control may be monitored to detect the presence of a cap positioned on the container, for example. For example, as soon as a cap is expected to be in the capper head, the control element may be pulled upwards to a certain extent, thus exerting pressure on the cap. If there is no cap in the capper head or on the container, the control element continues to move upwards. This can be recognized by sensors, for example.

In a further embodiment, the at least one movement arm has multiple movement arms, which are preferably arranged in a manner distributed around a central vertical axis of the capper head.

Preferably, the actuation section of the at least one movement arm may be arranged decentrally inside the cover.

In one design variant, the at least one movement arm has at least one forming movement arm for forming the cap, wherein the contact section of the at least one forming movement arm is a forming element (for example, roll-on element or flanging element) for forming the cap. Preferably, the at least one forming movement arm has at least one roll-on movement arm for inserting a thread into the cap by rolling on against a thread of the container, wherein the contact section of the at least one roll-on movement arm is a roll-on element, preferably a threaded roller. Alternatively or additionally, the at least one forming movement arm has at least one flanging movement arm for inserting a flanging into the cap, wherein the contact section of the at least flanging movement arm is a flanging element, preferably a flanging roller.

In a further design variant, the at least one movement arm has at least one gripper movement arm for gripping the cap, wherein the contact section of the at least one gripper movement arm is a holding clamp for holding the cap.

A further aspect of the present disclosure relates to a device for capping containers, wherein the device has a capper head as disclosed herein and a servo drive. The capper head may be driven by the servo drive (or servo motor) for rotation. For example, the servo drive can also rotate the cover, for example by rotating the shaft, preferably a hollow shaft, that has the cover as an end section or that is connected to the cover in a driving manner. Advantageously, the screwing process may be controlled by the servo drive. For example, the capper head may not rotate if contact occurs between the capper head and the cap. After placement, the rotational movement, for example for forming the cap, preferably rolling on and/or flanging, can take place at any moment. The rotational speeds may then run through ramps, for example roll on slowly, roll off faster and slowly, remain stable, pivot back the gripper arms—the container runs out of the machine in a capped state.

It is also possible that the servo drive is used for so-called condition monitoring. For example, a screw torque of the servo drive can be detected. Depending on the pneumatic contact pressure, an evaluation may be performed or a system check (for example: check of whether all bearings and seals are functional). For example, deviations from torque may indicate incorrect closures and may be reported. Detected deviations may, for example, also signal a readjustment or reparameterization of the system.

A further aspect of the present disclosure relates to a capper, such as a capper carousel. The capper may have multiple devices for capping as disclosed herein or multiple capper heads as disclosed herein, which are preferably arranged in a manner distributed around a circumference of the capper.

Preferably, the capper head as disclosed herein or the capper as disclosed herein may be comprised in a container processing system for manufacturing, cleaning, coating, inspecting, filling, capping, labeling, printing and/or packaging containers for liquid media, preferably beverages or liquid foods.

For example, the containers can be configured as bottles, cans, canisters, cartons, vials, etc.

The preferred embodiments and features of the invention described above can be combined with one another as desired.

BRIEF DESCRIPTION OF THE DRAWINGS

Further details and advantages of the invention are described below with reference to the accompanying drawings, in which.

The embodiments shown in the drawings correspond at least in part, so that similar or identical parts are provided with the same reference signs and reference is also made to the description of other embodiments or figures for the explanation thereof to avoid repetition.

DETAILED DESCRIPTION OF EMBODIMENTS

Figure 1:
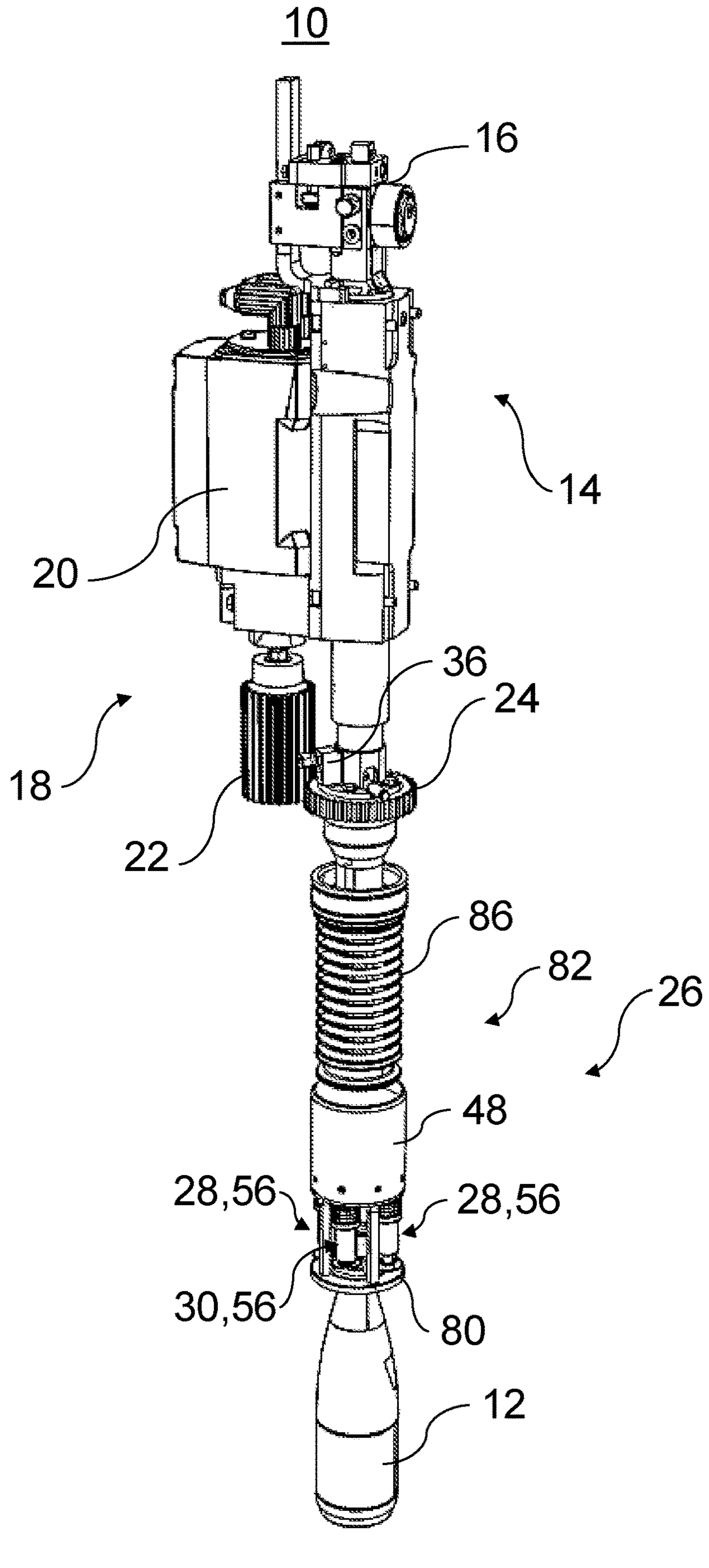
FIG. 1 shows a perspective view of a device for capping containers.

FIGS. 1 to 4 show a device 10 (or sections thereof) for capping containers 12.

The device 10 may be comprised, preferably together with other, preferably identical, devices for capping containers 12 in a capper for a container processing system.

The capper may provide the containers 12 with a cap by means of the device(s) 10. Preferably, the capper may be a roll-on capper that rolls the caps onto the containers 12 and, for example, inserts a thread and/or a flanging into the caps. The capper may, for example, be arranged downstream of the container of a filling device for filling the containers 12.

Preferably, the capper may be designed as a capping carousel or a rotary-type capper. The plurality of devices 10 (only one of which is shown in FIG. 1) may be arranged in a manner distributed around a circumference of the capper.

The device 10 has a capper head 26. Optionally, the device 10 may further have a lifting mechanism 14 and/or a drive 18.

Figure 2:
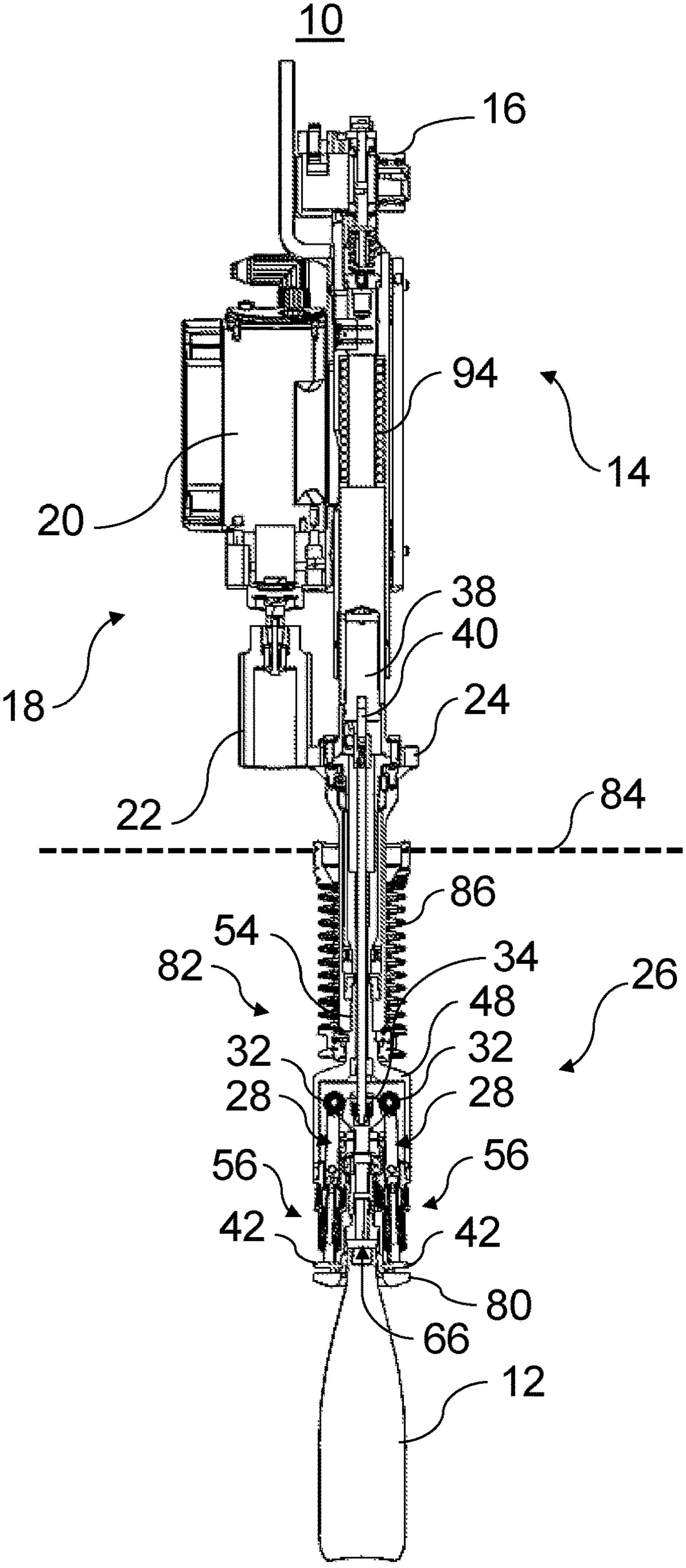
FIG. 2 shows a sectional view of the exemplary device of FIG. 1.

The lifting mechanism 14 is shown by way of example in FIGS. 1 and 2. The lifting mechanism 14 may raise and lower the device 10 and, in particular, the capper head 26. For example, the capper head 26 may be lowered by the lifting mechanism 14 for capping the container 12 and/or raised to release the container 12 after the container 12 has been capped. Preferably, the lifting mechanism 14 may have a rotatable running roller 16. The running roller 16 may be guided in a preferably circumferential lifting curve of the capper. A height course of the lifting curve can thus specify a lifting and lowering of the device 10 or of the capper head 26.

The drive 18 is shown by way of example in FIGS. 1 and 2. The drive 18 may rotate the capper head 26 about a central vertical axis of the capper head 26. For example, the drive 18 may have an electric drive unit 20 and a drive wheel 22. The drive unit 20 may preferably be a servo motor or a stepper motor. The drive unit 20 may rotate the drive wheel 22. The rotating drive wheel 22 may rotate a driven wheel 24 of the device 10. For example, the driven wheel 24 may be connected in a driving manner to the capper head 26 via a hollow shaft configuration for rotating the capper head 26. As an alternative to the drive 18, for example, a mechanically effected rotation of the capper head 26 may be provided, for example by the driven wheel 24 meshing with a preferably rotating stationary toothed rack.

Figure 3:
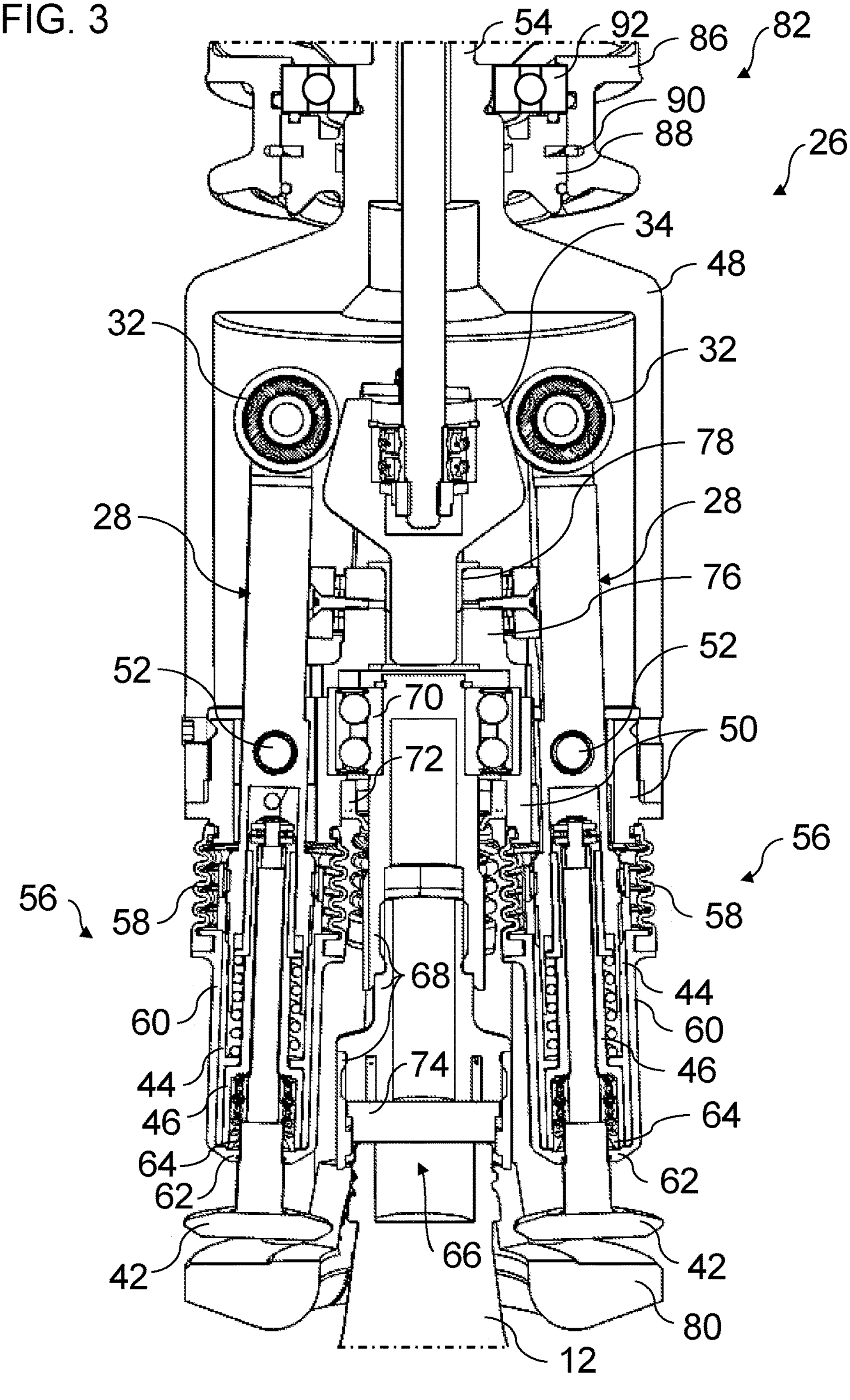
FIG. 3 shows a sectional view through a section of a capper head according to an exemplary embodiment of the present disclosure.

The capper head 26 has at least one movement arm 28, 30, a control element 34 and a cover 48, as shown for example in FIG. 3. The capper head 26 may further have a lid 50, at least one sealing device 56, a pressing device 66, a bearing body 76, a centering plate 80 and/or a (for example, further) sealing device 82.

Preferably, at least some of the components of the capper head 26 may be made of aluminum, such as the at least one movement arm 28, 30, the control element 34, the cover 48, the lid 50, the pressing device 66, the bearing body 76 and/or the centering plate 80.

As described below, multiple movement arms 28, 30 are preferably comprised for each capper head 26. For example, two movement arms 28 and two movement arms 30 may be comprised. The movement arms 28, 30 may preferably be arranged in a manner distributed around a central vertical axis of the capper head 26. However, all of the features described herein may also be used in embodiments in which only one movement arm is comprised (not shown in the figures).

The movement arms 28, 30 are preferably pivotable. Preferably, the movement arms 28, 30 may be designed as pivot levers. Preferably, a pivot axis of the respective movement arm 28, 30 may run substantially horizontally. However, it is also possible for the at least one movement arm to be movable in a different way, for example displaceable in a horizontal plane and/or along a vertical axis.

The movement arms 28 are shown in detail in FIG. 3. A lower section of one of the movement arms 30 is shown in detail in FIG. 4.

The movement arms 28, 30 each have an actuation section 32 and a contact section 42. Preferably, the actuation section 32 and the contact section 42 may be arranged at opposite ends of the respective movement arm 28, 30.

Via the actuation section 32, the respective movement arm 28, 30 may be actuated by the control element 34 for movement, preferably by means of a direct mechanical contact between the actuation section 32 and the control element 34.

The actuation section 32 is arranged inside the cover 48. The actuation section 32 may be arranged at an upper end of the respective movement arm 28, 30.

The actuation section 32 may, for example, take the form of a control roller, as shown in FIG. 3. The control roller may follow an outer contour of the control element 34. However, other, for example mechanical, connections between the control element 34 and the actuation section 32 for effecting a movement of the respective movement arm 28, 30 by means of the control element 34 are also conceivable, for example by means of a control cross or by means of an articulated connection (for example, with elongated hole loops as an actuation section 32 and connecting pins on the control element 34).

Preferably, the control element 34 is axially movable, particularly preferably with respect to a central vertical axis of the capper head 26. It is possible that the control element 34 is guided axially on the bearing body 76.

As shown in FIG. 3, the control element 34 may preferably be designed as a control wedge. The control wedge may abut the actuation sections 32, which are designed as control rollers. An axial movement of the control element 34 may effect a pivoting movement of the movement arms 28, 30.

For example, an axial movement of the control element 34 in a first direction, for example vertically upwards, may push the actuation sections 32 outward. The movement arms 28, 30 may pivot such that the actuation sections 32 pivot outwardly with respect to a central vertical axis of the capper head 26, thereby causing the contact sections 42 to pivot inwardly with respect to the central vertical axis of the capper head 26, for example until they come into contact with the cap of the container 12.

On the other hand, an axial movement of the control element 34 in a second direction opposite to the first direction, for example vertically downwards, may effect a movement of the actuation sections 32, for example guided or effected by means of (elastic or magnetic) pretensioning, inwards in the direction of the central vertical axis of the capper head 26. The movement arms 28, 30 may pivot such that the actuation sections 32 pivot inwardly with respect to a central vertical axis of the capper head 26, thereby causing the contact sections 42 to pivot outwardly with respect to the central vertical axis of the capper head 26, for example until they are out of contact with the cap of the container 12.

The control element 34 is arranged inside the cover 48. Preferably, the control element 34 may be centrally arranged in the cover 48. The control element 34 may be aligned along a central vertical axis of the capper head 26. For example, the central vertical axis of the capper head 26 may be a rotational symmetry axis of the control element 34.

The control element 34 may be arranged in a manner internal to the actuation sections 32 of the movement arms 28, 30.

Particularly preferably, the control element 34 is pneumatically actuated. For example, as shown in FIG. 1, the device 10 may have a pneumatic port 36. The pneumatic port 36 may, for example, be arranged at the level of the drive 18 and/or above the sealing device 82. Preferably, a compressed air line may be connected to the pneumatic port 36. The pneumatic port 36 may be connected to the control element 34 in a driving manner.

For example, a pneumatic cylinder 38 may be comprised with an axially movable control piston 40, as shown for example in FIG. 2. The pneumatic cylinder 38 may be arranged with the control piston 40 in a drive connection between the pneumatic port 36 and the control element 34. A hollow shaft configuration driven by the drive 18 to rotate the capper head 26 may preferably coaxially surround the drive connection between the control piston 40 and the control element 34.

Via the contact section 42, the respective movement arm 28, 30 may contact the cap (not shown in the figures) for capping the container 12. The contact section 42 may be arranged at a lower end of the respective movement arm 28, 30, as shown for example in FIGS. 3 and 4.

Depending on the function of the movement arm 28, 30, the contact section 42 may be designed and/or mounted differently.

It is possible for the movement arm 28, 30 to have an axial bearing section 44 and/or a rotational bearing section 46.

The contact section 42 may be mounted so as to be axially movable in the axial bearing section 44. The axial movability may preferably exist with respect to a longitudinal axis of the movement arm 28, 30. For example, the contact section 42 may be elastically pretensioned to retract into the axial bearing section 44. The axial bearing section 44 may, for example, be designed as a sliding sleeve, in which the rotational bearing section 46 is mounted so as to be axially movable with the contact section 42. The axial bearing section 44 may be fixedly connected, such as screwed, to an upper part of the movement arm 28, 30.

The contact section 42 may be mounted so as to be rotatable in the pivot bearing section 46, preferably rotatably about a central longitudinal axis of the movement arm 28, 30. The rotatable mounting may be provided, for example, by means of rolling bearings between the rotatable bearing section 46 and a shaft of the contact section 42. The axial bearing section 44 may surround the rotational bearing section 46.

Figure 4:
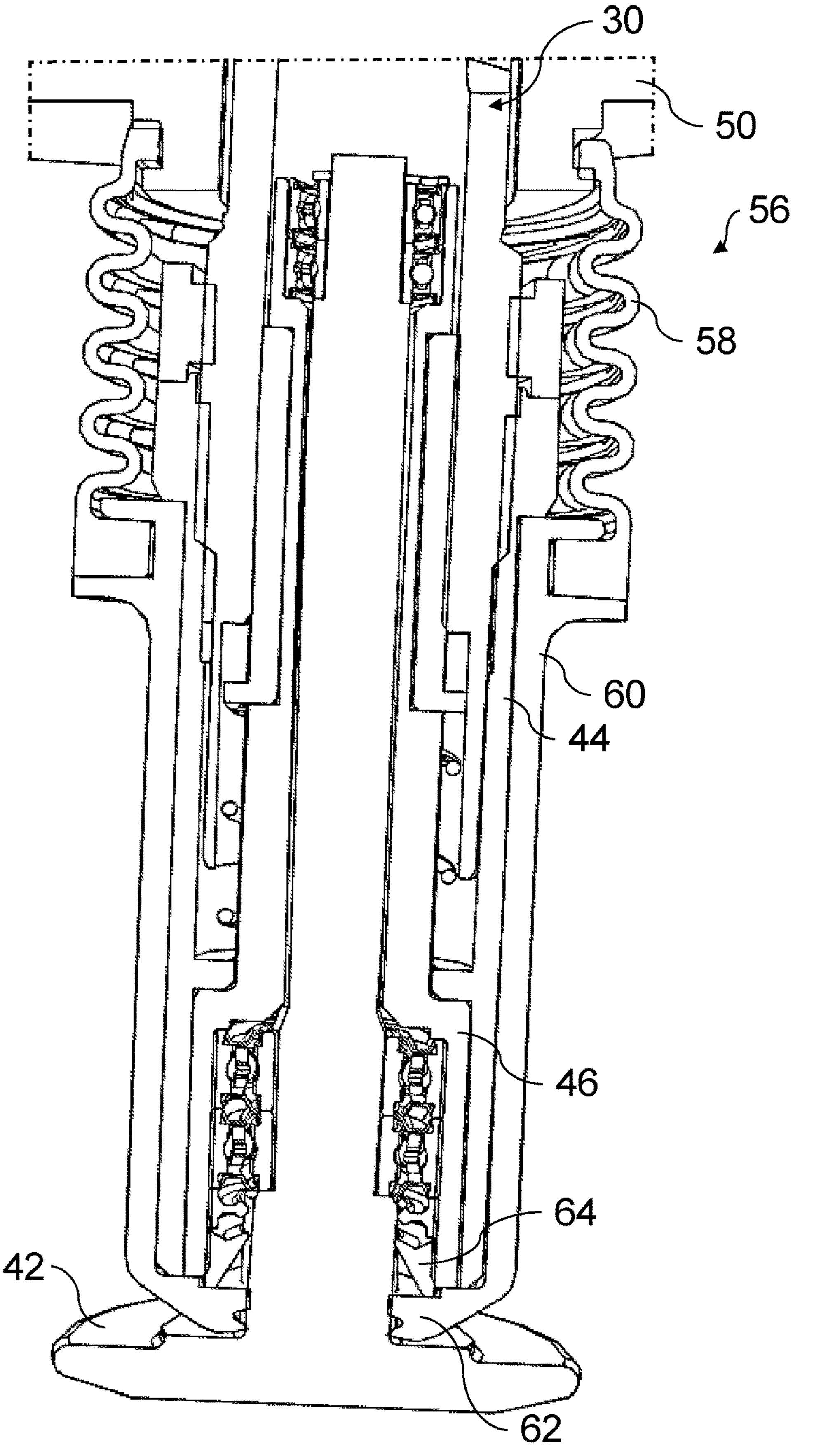
FIG. 4 shows a further sectional view through a section of the exemplary capper head.

For example, the movement arms 28, 30 shown in detail in FIG. 3 and FIG. 4 may be designed as forming movement arms with contact sections 42 designed as forming elements for forming the cap. Specifically, the movement arms 28 may be flanging movement arms and the movement arms 30 may be roll-on movement arms. It is also possible that, for example, only roll-on movement arms or only flanging movement arms are comprised.

The two movement arms 28, designed as flanging movement arms, may be arranged opposite one another, for example with respect to a central vertical axis of the capper head 26. The movement arms 28, designed as flanging movement arms, may each have a flanging roller as a contact section 42. The flanging roller may be used to insert, for example emboss, a flanging into the cap. The capper head 26 may be rotated about its own central vertical axis to insert the flanging, and preferably the contact section 42 may also be rotated about its own central vertical axis or central longitudinal axis of the respective movement arm 28, for example inside the rotational bearing section 46.

The two movement arms 30, which are designed as roll-on movement arms, may be arranged opposite one another, for example with respect to a central vertical axis of the capper head 26. The movement arms 30, which are designed as roll-on movement arms, may each have a roll-on element, preferably a threaded roller, as a contact section 42. The roll-on element may insert a thread into the cap from the outside. To insert the thread, the capper head 26 may be rotated about its own central vertical axis, and preferably the contact section 42 may also be rotated about its own central vertical axis or central longitudinal axis of the respective movement arm 30. Additionally, the contact section 42 may perform an axial movement to create a helical or helix shape of the thread. Preferably, the contact sections 42 may extend from a section of the movement arm 30 guided by an external thread of the container 12. Preferably, the axial movability may be enabled by means of the axial bearing section 44.

However, it is also conceivable that the movement arms 28, 30 are not forming movement arms for forming the cap.

Instead, the movement arms 28, 30 may be designed, for example, as gripper or holding movement arms for gripping or holding the cap (not shown in the figures). Accordingly, the contact sections 42 in this case may each be designed as holding clamps for holding the cap.

The exemplary cover 48 shown in FIGS. 1 to 3 covers the control element 34 and the actuation sections 32 of the movement arms 28, 30. The cover 48 may preferably be hood-shaped or trough-shaped. Preferably, the control element 34 and the actuation sections 32 are received inside the cover 48 in a sealed and/or encapsulated manner. Preferably, the control element 34 and the actuation sections 32 may thus be protected from cleaning fluid, etc., if the capper head 26 is being cleaned. The cover 48 may be arranged coaxially with a central vertical axis of the capper head 26.

On the other hand, the movement arms 28, 30 may project from the cover 48 in a sealed manner. Preferably, the contact sections 42 of the movement arms 28, 30 may be arranged outside of the cover 48.

Particularly preferably, the cover 48 is a preferably lower end section of a shaft 54 for rotating the capper head 26, as shown for example in FIGS. 2 and 3. Accordingly, the cover 48 may be rotated during operation, for example, by the drive 18. The shaft 54 is preferably a hollow shaft. For example, the shaft 54 may be a part of the drive connection between the drive 18 and the capper head 26. The shaft 54 is preferably part of the specified hollow shaft configuration for rotating the capper head 26. The shaft 54 may preferably coaxially surround a section of the drive connection between the control piston 40 and the control element 34.

The cover 48 may serve as a support for the capper head 26. For example, the cover 48 may directly or indirectly support the movement arms 28, 30, the lid 50, the at least one sealing device 56, the pressing device 66, the bearing body 76 and/or the centering plate 80.

The exemplary lid 50 shown in FIGS. 3 and 4 may be attached to the underside of the cover 48, for example by means of screw connections. Preferably, the movement arms 28, 30 may extend through a respective opening in the lid 50, such that preferably the actuation sections 32 are arranged inside the cover 48 and the contact sections 42 are arranged outside of the cover 48.

The movement arms 28, 30 may be pivotally mounted on the lid 50. For example, pivot axes 52 of the movement arms 28, 30 may be mounted on the lid 50 (see, for example, FIG. 3). The movement arms 28, 30 may be pivotable about the respective pivot axis 52. The pivot axes 52 preferably run substantially in a horizontal plane. The pivot axes 52 may be designed in the form of connecting pins or trunnions, for example.

For creating a seal between the movement arms 28, 30 and the lid 50, a sealing device 56 may be comprised for each movement arm 28, 30, as exemplified, for example, in FIGS. 3 and 4. A respective sealing device 56 may create a seal between a respective movement arm 28, 30 and the lid 50. The sealing device 56 may thereby preferably enable and seal a pivoting movement of the respective movement arm 28, 30, for example about the respective pivot axis 52. Alternatively or additionally, the sealing device 56 may enable and seal a rotational movement of the contact section 42 of the respective movement arm 28, 30. The rotational movement may, for example, take place about a longitudinal axis of the respective movement arm 28, 30. Alternatively or additionally, the sealing device 56 may enable and seal an axial movement of the respective contact section 42. The axial movement may be, for example, an axial movement relative to the lid 50 or the cover 48.

Each sealing device 56 may have, for example, a bellows 58, a sealing sleeve 60 and/or a radial shaft seal 64. The bellows 58, the sealing sleeve 60 and/or the radial shaft seal 64 may surround a section of the respective sealed movement arm 28, 30, preferably coaxially.

On the one hand, the bellows 58 may be attached to the lid 50, for example in a positive-locking manner. On the other hand, the bellows 58 may be attached to the sealing sleeve 60, for example in a positive-locking manner. For example, an upper end of bellows 58 may be attached to the lid 50, and a lower end of bellows 58 may be attached to the sealing sleeve 60.

The bellows 58 may have an elastically expandable material. The bellows 58 may be axially expandable to enable, for example, a sealed axial movement of the contact section 42. The bellows 58 may also provide sealed pivoting movement of the respective movement arm 28, 30.

On the one hand, the sealing sleeve 60 may be attached to the bellows 58, for example in a positive-locking manner. For example, an upper end of the sealing sleeve 60 and a lower end of the bellows 58 may be engaged in a positive-locking manner. On the other hand, the sealing sleeve 60 may have a sealing lip 62, which may abut the contact section 42 or a shaft of the contact section 42. Preferably, the sealing lip 62 is arranged at a lower end of the sealing sleeve 60. The sealing sleeve 60 may preferably comprise a PTFE material or, for example, an elastic material, such as a relatively hard elastomer, such as a Shore 80 Viton FKM.

The sealing sleeve 60 may surround the axial bearing section 44. The sealing sleeve 60 may slide and/or axially expand along an outer shell surface of the axial bearing section 44 upon an axial movement of the contact section 42 relative to the axial bearing section 44. The contact section 42 may rotate in a manner mounted in the rotational bearing section 46, wherein the sealing sleeve 60 may slide with its sealing lip 62 along an outer shell of the contact section 42 or the shaft of the contact section 42.

The radial shaft seal 64 may be received in the rotational bearing section 46. The radial shaft seal 64 may contact an outer shell of the contact section 42 or the shaft of the contact section 42 in a sealing manner. The radial shaft seal 64 may assist the sealing by the sealing sleeve 60. The radial shaft seal 64 may create a seal between the contact section 42, on the one hand, and the rotational bearing section 46 and/or the sealing sleeve 60.

For sealing the pivoting movement of the movement arm 28, 30, the axial movement of the contact section 42, and/or the rotational movement of the contact section 42, the bellows 58, the sealing sleeve 60 and optionally the radial shaft seal 64 may cooperate with one another.

The pressing device 66, shown for example in FIG. 3, may press the cap onto the container 12 from above during the capping of the container 12. Preferably, the pressing device 66 may thereby decouple the cap from a rotation of the capper head 26. The pressing device 66 preferably has a plunger 68 and optionally a sealing element 72.

Preferably, the plunger 68 of the pressing device 66 may be pressed onto the cap, if the device 10 is lowered from the lifting mechanism 14. The plunger 68 may be axially secured to the lid 50. The plunger 68 may be arranged centrally with respect to the lid 50. The plunger 68 may be single-part or multi-part.

The plunger 68 may be mounted so as to be rotatable. Preferably, the plunger 68 is mounted so as to be rotatable in the lid 50 by means of at least one rolling bearing 70. The rolling bearing 70 may be designed to absorb axial forces arising during pressing. An inner circumferential side of the rolling bearing 70 may abut an outer circumferential side of the plunger 68. An outer circumferential side of the rolling bearing 70 may abut an inner circumferential side of a, preferably central, hole of the lid 50. The rolling bearing 70 may be axially secured.

The plunger 68 projects from the cover 48 and the lid 50 in a sealed manner. The sealing element 72 may create a seal between the plunger 68 and the lid 50. Preferably, the sealing element 72 may seal a rotational movement of the plunger 68 relative to the lid 50. For example, the sealing element 72 may be a radial shaft seal.

It is possible for the plunger 68 to have an ejector element 74. The ejector element 74 may be received in the plunger 68 in an axially movable manner. The ejector element 74 may, for example, be elastically pretensioned downwards, for example by means of at least one coil spring, which is arranged inside the plunger 68. The ejector element 74 may be a disk. The ejector element 74 may be arranged at a lower end of the plunger 68. The ejection element 74 may eject a (unused) cap, if it could not be applied to a container 12.

By means of the ejection element 74, the cap may be subjected to head pressure during capping. It is possible that the device 10 enables a head pressure adjustment. For example, the elastic pretensioning of the ejector element 74 in the plunger 68 may be set by adjusting a relative axial positioning of two parts of the plunger 68 relative to one another. It is also possible for elastic pretensioning elements to be switched to pretension the ejection element 74, in order to effect a change in head pressure.

The bearing body 76, shown by way of example in FIG. 3, may be arranged inside the cover 48. The bearing body 76 may be arranged coaxially with a central vertical axis of the capper head 26.

The bearing body 76 may be secured to the lid 50 and/or the cover 48, preferably for rotation therewith about a central vertical axis of the capper head 26. The bearing body 76 may be secured to the lid 50 from above, for example by means of screw connections.

The bearing body 76, together with the lid 50, may axially secure the rolling bearing 70. Therefore, the bearing body 76 may also be referred to as the securing shaft.

For example, the control element 34 may be axially guided on an upper section of the bearing body 76. Preferably, a slide bearing 78 may be arranged between, for example, a central opening of the bearing body 76 and a cylindrical, for example lower section, of the control element 34, as shown, for example, in FIG. 3. For example, the slide bearing 78 may be inserted, for example pressed, into the opening of the bearing body 76. The slide bearing 78 may be designed as a slide bearing sleeve, for example.

The exemplary centering plate 80 shown in FIGS. 1 to 3 may be fastened to the lid 50 from below. The centering plate 80 may be ring-shaped, for example. A container neck of the container 12 may extend through a central opening of the centering plate 80 during the capping of the container 12.

The sealing device 82 may create a seal between the shaft 54 or the cover 48 and a separator plate 84 (shown only schematically in FIG. 2). The separator plate 84 may be used for clean room separation. For example, the drive 18 and the lifting mechanism 14 may be arranged above the separator plate 84. The capper head 26 may be arranged below the separator plate 84. Preferably, the separator plate 84 may rotate in operation along with the device 10 about a longitudinal axis of the capper.

The sealing device 82 may have a bellows 86 and a radial shaft seal 88, as shown for example in FIGS. 2 and 3.

The bellows 86 and the radial shaft seal 88 may create a seal together between the separator plate 84 and the shaft 54. Thereby, a rotational movement of the shaft 54, for example driven by the drive 18, and an axial movement of the shaft 54, for example effected by the lifting mechanism 14, may be sealed.

One, preferably upper, end of the bellows 86 may be attached to the separator plate 84, for example in a positive-locking or force-fitting manner. One, preferably lower, end of the bellows 86 may surround the shaft 54. Preferably, there is an annular gap between the end of the bellows 86 and the shaft 54. The bellows 86 may expand axially if the shaft 54 is lowered by the lifting mechanism 14. The bellows 86 may compress axially if the shaft 54 is lifted by the lifting mechanism 14.

The radial shaft seal 88 may create a seal between the shaft 54 and the bellows 86. Preferably, the radial shaft seal 88 may be arranged in the annular gap between the shaft 54 and the bellows 86. The radial shaft seal 88 may seal a rotational movement between the shaft 54 and the bellows 86.

The radial shaft seal 88 may be axially secured. Preferably, the radial shaft seal 88 may be axially secured to an inner circumferential surface of a lower end of the bellows 86 by means of a securing ring 90, preferably a snap ring. The securing ring 90 may engage an outer circumferential groove of the radial shaft seal 88 and an inner circumferential groove of the bellows 86.

A rolling bearing 92 may further be arranged between the bellows 86 and the shaft 54. The rolling bearing 92 may rotatably mount the shaft 54. The rolling bearing 92 may enable a rotation of the shaft 54 inside the bellows 86. The rolling bearing 92 may be arranged above the radial shaft seal 88 inside the bellows 86.

It is possible that the sealing device 82 has one or more O-rings as clamping and/or sealing rings, as shown for example in FIG. 3. For example, an O-ring may be arranged at a lower end of the radial shaft seal 88, such as below the securing ring 90, between the radial shaft seal 88 and the bellows 86. An O-ring may be arranged (axially) between the rolling bearing 92 and the radial shaft seal 88, preferably to assist in axially securing the rolling bearing 92. An O-ring may be arranged between the shaft 54 and the rolling bearing 92. An O-ring may be arranged between the rolling bearing 92 and the bellows 86.

It is also possible that the device 10 has a head pressure spring 94, as shown for example in FIG. 2. The head pressure spring 94 may be used to set a head pressure when pressing the cap onto the container 12. The head compression spring 94 may be comprised in or coupled to the lifting mechanism 14. For example, the head compression spring 94 may be arranged at the same level as the drive unit 20. Preferably, the head compression spring 94 may be arranged above the separator plate 84. In cases in which it is desired to switch to a different cap format, only the capper head 26 may be replaced, but the head pressure spring 94 (and other components of the device 10) can continue to be used. It is also possible to switch the head pressure spring 94 to change the head pressure.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims, irrespective of the claims to which they refer. In particular, the individual features of independent claim 1 are each disclosed independently of one another. In addition, the features of the dependent claims are also disclosed independently of all of the features of independent claim 1 and, for example, independently of the features relating to the presence and/or configuration of the at least one movement arm, the control element and/or the cover of independent claim 1.

LIST OF REFERENCE SIGNS

10 Device for capping
12 Container
14 Lifting mechanism
16 Running roller
18 Drive
20 Drive unit
22 Drive wheel
24 Driven wheel
26 Capper head
28 Movement arm
30 Movement arm
32 Actuation section
34 Control element
36 Pneumatic port
38 Pneumatic cylinder
40 Control piston
42 Contact section
44 Axial longitudinal section
46 Rotational bearing section
48 Cover
50 Lid
52 Pivot axis
54 Shaft
56 Sealing device
58 Bellows
60 Sealing sleeve
62 Sealing lip
64 Radial shaft seal
66 Pressing device
68 Plunger
70 Rolling bearing
72 Sealing element
74 Ejector element
76 Bearing body
78 Slide bearing
80 Centering plate
82 Sealing device
84 Separator plate
86 Bellows
88 Radial shaft seal
90 Securing ring
92 Rolling bearing
94 Head pressure spring

The invention claimed is:

1. A capper carousel comprising:

multiple capper heads for capping containers, wherein the multiple capper heads are arranged in a manner distributed around a circumference of the capper carousel, each capper head comprising:

a plurality of pivotable movement arms that are designed as pivot levers, each movement arm having an actuation section for actuating a respective one of the plurality of pivotable movement arms and a contact section for contacting a cap;

an axial moveable control element, which is configured to be brought into contact with the actuation sections of the plurality of pivotable movement arms of the capper head to effect a pivoting lever movement of the plurality of pivotable movement arms of the capper head;

a cover covering the axial moveable control element of the capper head and the actuation sections of the plurality of pivotable movement arms of the capper head; wherein each one of the multiple covers is associated with a respective one of the multiple capper heads; and wherein the axial moveable control element and the actuation sections of the plurality of pivotable movement arms are received inside the cover in at least one of a sealed and encapsulated manner.

2. The capper carousel according to claim 1, wherein:

each movement arm projects from the cover in a sealed manner, such that the contact section of each movement arm is arranged outside of the cover.

3. The capper carousel according to claim 1, further comprising a lid that is attached to an underside of the cover and through which each movement arm extends in a sealed manner.

4. The capper carousel according to claim 3, wherein at least one of:

the lid extends in the sealed manner decentrally with respect to the lid, and each movement arm is pivotally mounted on the lid.

5. The capper carousel according to claim 3, further comprising:

at least one sealing device that creates a seal between the lid and each movement arm, for at least one of sealing a pivoting movement of a respective movement arm, an axial movement of the contact section of the respective movement arm and a rotational movement of the contact section of the respective movement arm.

6. The capper carousel according to claim 5, wherein at least one of:

each movement arm has an axial bearing section, in which the contact section is mounted so as to be axially movable, and the at least one sealing device seals an axial movement of the contact section relative to the axial bearing section between the lid and the contact section;

each movement arm has a rotational bearing section in which the contact section is mounted so as to be rotatable, and the at least one sealing device seals a rotational movement of the contact section relative to the rotational bearing section between the lid and the contact section; and each movement arm is pivotable and the at least one sealing device seals a pivoting movement of each movement arm between the lid and the contact section.

7. The capper carousel according to claim 5, wherein the sealing device has at least one of:

a bellows that expands or compresses axially when the contact section moves axially;

a sealing sleeve that at least one of moves axially with the contact section and expands or compresses axially when the contact section moves axially; and a radial shaft seal.

8. The capper carousel according to claim 1, further comprising:

a pressing device with a plunger for pressing the cap onto a container mouth of the container, wherein the plunger projects from the cover in a sealed manner.

9. The capper carousel according to claim 8, wherein the pressing device further includes:

a sealing element which creates a seal between the lid and the plunger.

10. The capper carousel according to claim 9, wherein at least one of:

the sealing element is a radial shaft seal;

the plunger is rotatable; the plunger is axially secured to the lid; and the plunger is arranged centrally with respect to the lid.

11. The capper carousel according to claim 1, wherein at least one of:

the cover is a section of a shaft for rotating the capper head; and the cover supports each movement arm.

12. The capper carousel according to claim 11, further comprising:

a bellows arranged coaxially with the shaft; and a radial shaft seal which creates a seal between the bellows and the shaft, the radial shaft seal being axially secured to one end of the bellows.

13. The capper carousel according to claim 1, wherein at least one of:

the axial moveable control element is pneumatically actuated;

the axial moveable control element includes a control wedge; and the axial moveable control element is arranged centrally inside the cover.

14. The capper carousel according to claim 1, wherein:

the plurality of movement arms are arranged in a manner distributed around a central vertical axis of the capper head.

15. The capper carousel according to claim 1, wherein each movement arm has:

at least one forming movement arm for forming the cap, wherein the contact section of the at least one forming movement arm is a forming element for forming the cap.

16. The capper carousel according to claim 15, wherein the at least one forming movement arm has at least one of:

at least one roll-on movement arm for inserting a thread into the cap by rolling on against a thread of the container, wherein the contact section of the at least one roll-on movement arm includes a roll-on element and at least one flanging movement arm for inserting a flanging into the cap, wherein the contact section of the at least flanging movement arm includes a flanging element.

17. The capper carousel according to claim 1, wherein each movement arm has:

at least one gripper movement arm for gripping the cap, wherein the contact section of the at least one gripper movement arm includes a holding clamp for holding the cap.

18. The capper carousel according to claim 1, wherein the cover is one of hood-shaped and trough-shaped, and covers the plurality of pivotable movement arms for protection from cleaning fluid during external cleaning of the capper head.

19. The capper carousel according to claim 1, wherein each capper head comprises a central vertical axis therein, and the cover is arranged coaxially with the central vertical axis of the capper head.

20. The capper carousel according to claim 1, wherein the plurality of pivotable movement arms comprise a plurality of swivelable movement arms.

* * * * *